United States Patent [19]

Percebois

[11] Patent Number: 5,193,858
[45] Date of Patent: Mar. 16, 1993

[54] MOUNTED FLANGE FOR PIPEWORK JOINTS

[75] Inventor: Alain Percebois, Blenod Les Pont-A-Mousson, France

[73] Assignee: Pont-A-Mousson S. A., Nancy, France

[21] Appl. No.: 740,233

[22] Filed: Aug. 5, 1991

[30] Foreign Application Priority Data

Aug. 6, 1990 [FR] France .................. 90 10033

[51] Int. Cl.[5] .............................. F16L 17/06
[52] U.S. Cl. .................... 285/368; 285/412; 285/413; 285/364
[58] Field of Search ............... 285/368, 412, 413, 364

[56] References Cited

U.S. PATENT DOCUMENTS

| | | | |
|---|---|---|---|
| 504,739 | 9/1893 | Murray | 285/368 |
| 848,759 | 4/1907 | Mern | 285/368 |
| 1,309,146 | 7/1919 | Mann | 285/368 |
| 1,703,696 | 2/1929 | Stratford | 285/412 X |
| 1,709,837 | 4/1929 | Bulmahn | 285/368 |
| 1,951,034 | 2/1932 | Norton | 285/368 |
| 2,657,079 | 3/1950 | David | 285/368 |
| 3,498,643 | 3/1970 | Reiss | 285/412 X |
| 4,183,560 | 1/1980 | Wyss | 285/368 |

*Primary Examiner*—Randolph A. Reese
*Assistant Examiner*—Heather Chun
*Attorney, Agent, or Firm*—Sughrue, Mion, Zinn Macpeak & Seas

[57] ABSTRACT

To lock a pipework joint in place, a locking device 5 rests on a flange 4 mounted on the socket end of one of the pipes. The flange has, over at least one portion of its periphery, a radial L-shaped cross-section, the concavity of the L being oriented radially inwardly and mating with a complementary contour on the end of the socket.

8 Claims, 2 Drawing Sheets

MOUNTED FLANGE FOR PIPEWORK JOINTS

BACKGROUND OF THE INVENTION

This invention concerns the locking of "automatic" pipework joints, i.e., in which a male end is inserted into a socket while radially compressing a sealing gasket housed therein. In this case, water-tightness is achieved independently from the locking, which is intended solely to avoid the dislocation of the joints when the pipes carry highly pressurized fluids.

However, the invention may also be applicable to the locking of "mechanical" joints, i.e., in which water-tightness is obtained simultaneously with the locking by the axial compression of a sealing gasket.

SUMMARY OF THE INVENTION

An object of the invention is to provide a reliable and economical locking device for pipe joints. To this end, the invention provides a flange for joints mounted between pipework components and designed to be installed on the end contour of one of the components having a mating or complementary shape, and to act as a support for a joint-locking device, the flange having, over at least one portion of its periphery, a radial L-shaped cross-section, the concavity defined by the arms of the L being directed radially inwardly.

According to other features of the invention the respective arms of the L are positioned radially and parallel to the axis of the flange, which has an inclined support surface on a convex side thereof, such inclined support surface extending toward the flange axis until it reaches a position opposite the radial or vertical arm of the L, and the vertical arm of the L ending in an interior cylindrical surface.

Another object of the invention is to provide a pipework assembly comprising at least one pipework component fitted with an end contour, at least one mounted flange such as the one described above and whose internal shape mates with the external shape of the contour, and at least one locking device adapted to rest on the flange. The end contour may define a socket, and the assembly may additionally comprise a sealing gasket installed in the socket, and a male end of a second pipework component inserted in the socket while compressing the sealing gasket radially, such male end bearing support means cooperable with the locking device.

In one embodiment the support means comprises a retaining ring fitted over the male end and a weld seam formed thereon and/or the sealing gasket may be of the locking-insert type.

DETAILED DESCRIPTION OF THE PREFERRED EMBODIMENTS

Figure 1:
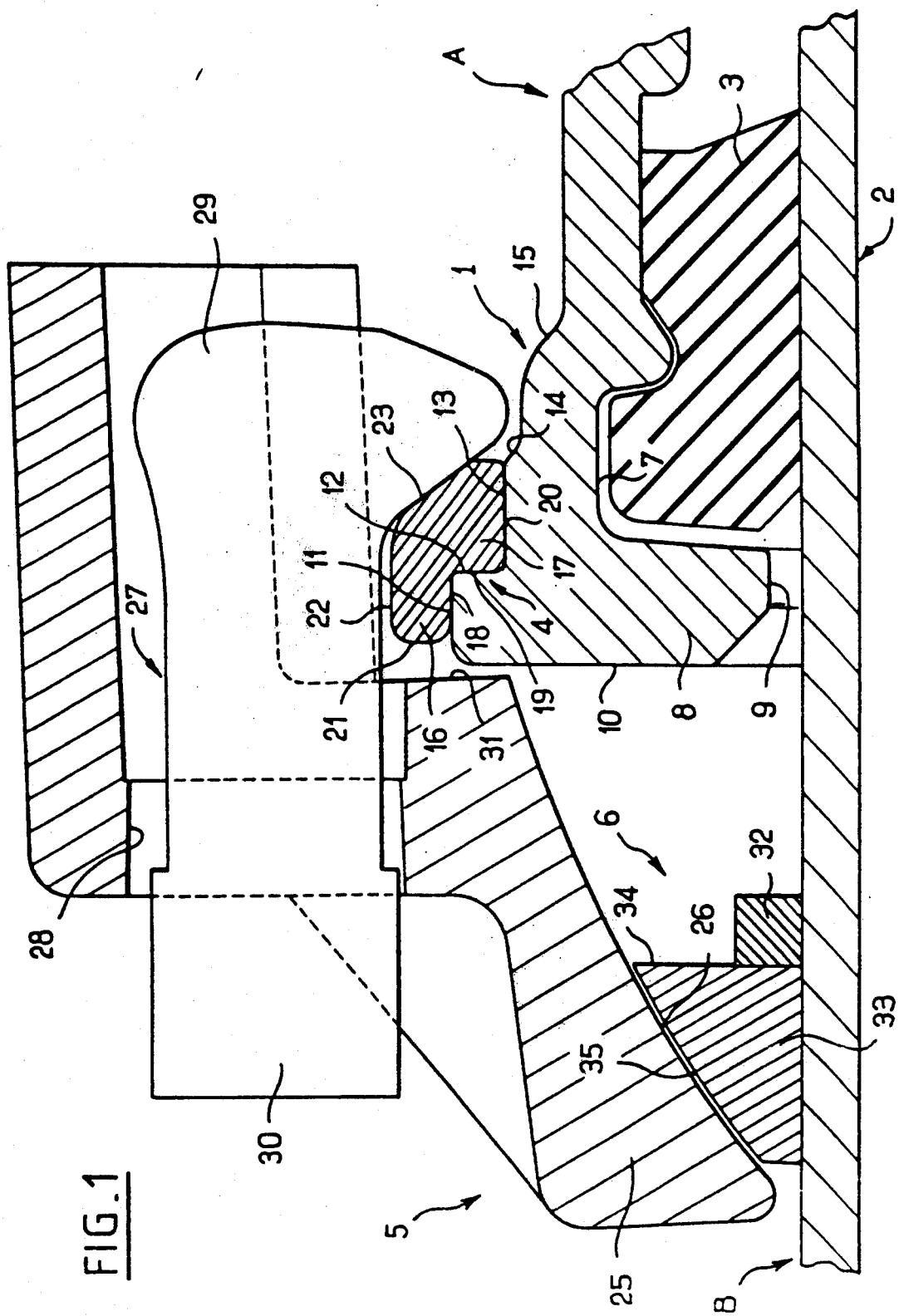
FIG. 1 is a longitudinal cross-section of one half of a substantially symmetrical pipework assembly according to the invention.

FIG. 1 shows a locked automatic joint produced between a socket 1 forming the end contour of a first pipework component A, which is, for example, a connecting sleeve or a pipe, and the male end 2, having a cylindrical exterior surface, of a second pipework component B formed by a pipe. Components A and B are made, for example, of cast-iron and produced by centrifuging. The joint further comprises a radial-compression sealing gasket 3, a mounted flange 4, a locking device 5, and support means 6 by which the device 5 rests on the male end.

The socket 1 comprises, internally, a housing 7 for the sealing gasket 3 and is delimited at its outer end by an internal radial wall 8. The latter defines an inlet opening 9 which allows the male end 2 to be inserted, while maintaining appreciable radial play, into the socket in order to radially compress the sealing gasket 3, thus ensuring the water-tightness of the joint. The wall 8 also defines a flat end section 10 of the socket.

Externally the socket has, in succession and beginning at the end section 10, a large diameter cylindrical surface 11, a radial surface 12, a smaller diameter cylindrical surface 13, a bend 14 extending toward the joint axis, and a curved surface 15 whose diameter decreases progressively.

The flange 4 is a slotted ring whose radial cross-section is uniform and visible in FIG. 1. This cross-section has an overall L shape, comprising one arm 16 parallel to the joint axis and a radial arm 17. The flange thus defines, internally, a large diameter cylindrical surface 18, a radial surface 19, and a smaller diameter cylindrical surface 20, these three surfaces forming an S which mates with the S formed by surfaces 11 to 13 of the socket. The front part of the flange is delimited by a flat end section 21 connected to the surface 18, and the exterior of the flange is delimited by a cylindrical surface 22 continuing from the surface 21 and by a tapered rear surface 23 extending from surface 22 to surface 20. The edges between surfaces 18 and 21, 21 and 22, 22 and 23, and 23 and 20 are rounded.

Figure 2:
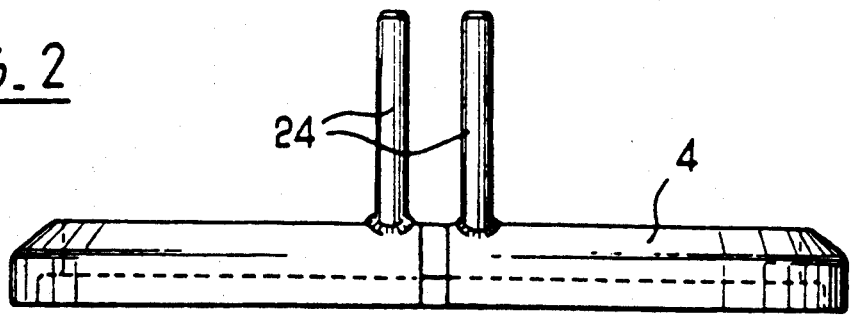
FIG. 2 is a top view of a free-standing flange of the FIG. 1 assembly.

As shown in FIG. 2, an axial pin 24 is attached to each end of the flange 4, on its rear surface. When the flange is placed on the socket 1 in the manner of a circlip, these two pins are connected by a tie piece such as an elastic band (not shown).

The locking device 5 comprises an annular collar 25, made of one or several parts, which has a spherical interior surface 26, and a series of support elements 27, each of which passes through an axial opening 28 provided on the periphery of the collar. Each element 27 comprises a shaft whose one end is fitted with an eccentric flange 29, and whose other end 30 is threaded to receive a nut (not shown). The collar 25 has a flat end section 31 on the side facing the socket 1.

The support means 6 comprise, first, a circular weld seam 32 made of one or several parts, laid down on the male end 2 and positioned on the outside of the socket when the joint is assembled, and second, a slotted retaining ring 33 fitted over the male end. This retaining ring comprises, on the side facing the socket, a flat surface 34 resting on the weld seam 32, and, on the other side, a spherical surface 35 which mates with the under surface 26 of the collar 25.

To produce the locked joint shown in FIG. 1, the locking device 5 and the retaining ring 33 are first fitted on the male end beyond the weld seam 32, and the flange 4 is positioned on the socket, thereby setting the surface 21 of the flange back from the end section 10 of the socket. Next, the male end is inserted in the socket, so that the two pipework components assume their final positions.

To lock the joint thus produced, the support elements 27 are inserted through the openings 28 after they have been turned 90° in relation to the position illustrated in FIG. I, thereby allowing the flanges 29 to pass over the flange 4.

Next, the elements 27 are turned 90° to bring them into their locking position, as shown. The nuts are then screwed on the threads 30 thereby bringing the inclined support surface of each flange 29 into contact with the mating surface 23 of the flange 4 over the entire axial length thereof, the surface 26 of the collar 25 being simultaneously brought into a resting position against the surface 35, and the surface 34 of the retaining ring 33 being brought, in addition, into a resting position against the weld seam 32. This ensures the locking of the joint and prevents its dislocation under the effect of the axial stresses generated when the pipes carry a pressurized fluid.

The use of the mounted flange 4 has several advantages, to wit:

a) the socket 1 is less solid and bulky than it would be if it had to integrally embody the support surface 23 by itself, thus reducing shrink hole problems in the cast-iron during centrifuging, b) because of the shape of the flange 4 as described above, locking stress is effectively transmitted to the socket without any risk of rocking the flange, c) the most suitable material may be chosen for the flange, for example cast-iron, steel, or even, for moderate pressures, a plastic, which thus provides electrical insulation of the successive pipe lengths, and d) identical pipework components A may be manufactured to form the joints intended to be locked and those not intended to be locked. Substantial savings of cast-iron may thus be made for all production operations.

Figure 3:
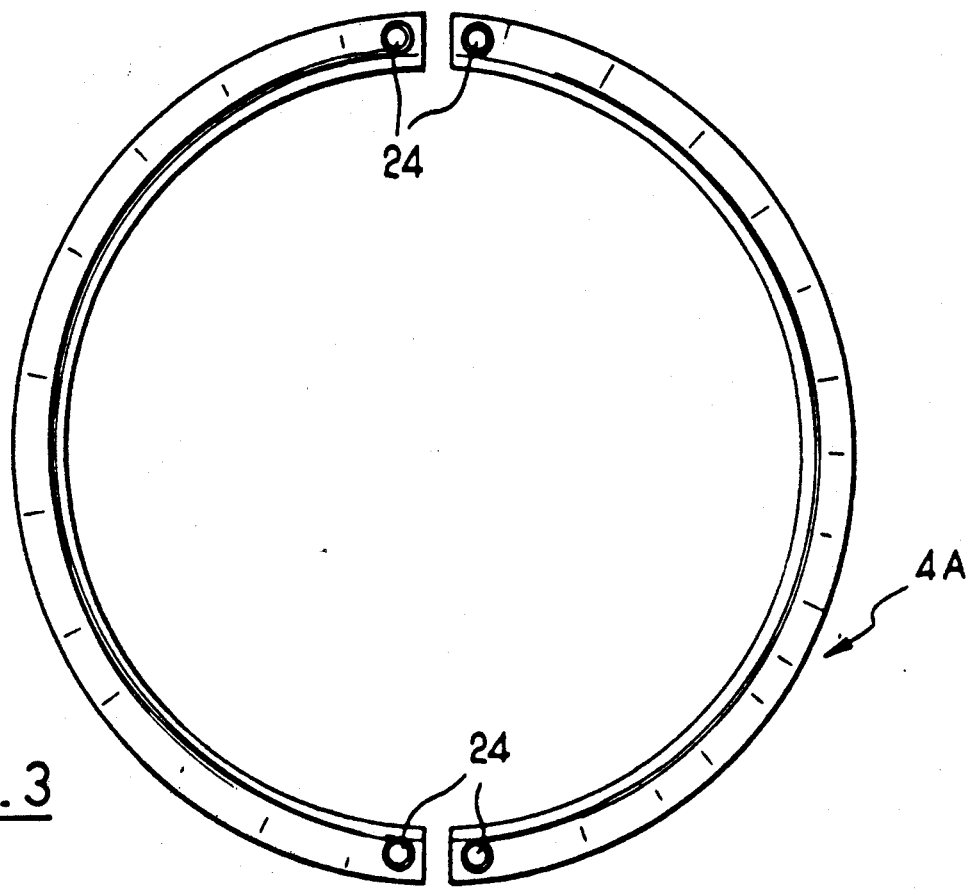
FIG. 3 is a front view of a variant of the flange.

As a variant, as illustrated in FIG. 3, the flange 4A may be formed from two halves, each of which is fitted, at each end, with a pin 24, these pins being connected in pairs, for example by means of an elastic band, when the flange is put in place on the socket. This variant is suitable, in particular, for small-diameter pipes, i.e., diameters of less than 200 mm.

Figure 4:
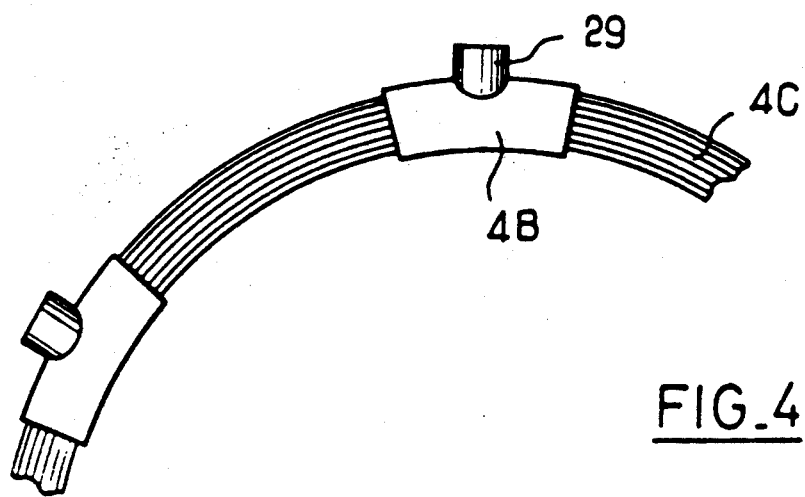
FIG. 4 illustrates another variant of the flange according to the invention.

As a further variant (FIG. 4), the flange may be formed from a number of sectors 4B connected by flexible elements 4C, such as rubber connection pieces.

The sealing gasket 3 may be of the locking-insert type, for example that described in commonly assigned French patent No. 2,621,376.

I claim:

1. A flange ring (4; 4A; 4B, 4C) for joints coaxially connecting elongate pipework components (A, B), and designed to be mounted on an exterior end contour (1) of one (A) of said components, and to act as a support for a joint-locking device (5), wherein said flange ring defines, over at least one portion of its circumference, a radial L-shaped cross-section, a concavity (18, 19) of the cross-section defined by arms of the L-shape being oriented radially inwardly and mating with a complementary surface (11, 12) of the exterior end contour and wherein said flange ring has, on a convex outer side thereof, a support surface (23) inclined relative to the flange axis.

2. A flange ring according to claim 1, wherein arms (16, 17) of the L extend, respectively, radially and parallel to an axis of the flange ring.

3. A flange ring according to claim 1, wherein the inclined support surface extends in an axial direction of the flange ring to a position opposite the radially extending arm (17) of the L-shape.

4. A flange ring according to claim 3, wherein the radially extending arm of the L-shape end in an interior cylindrical surface (20).

5. A pipework assembly, comprising: at least one pipework component (A) having a predetermining exterior end contour (1), a second pipework component (B), at least one flange ring (4; 4A; 4B, 4C) for joints coaxially connecting said pipework components (A,B), and designed to be mounted on an exterior end contour (1) of one (A) of said components, wherein said flange ring defines, over at least one portion of its circumference, a radial L-shaped cross-section, a concavity (18, 19) of the cross-section defined by arms of the L-shape being oriented radially inwardly and mating with a complementary surface (11, 12) of the exterior end contour and wherein said flange ring has, on a convex outer side thereof, a support surface (23) inclined relative to the flange axis, said flange ring being mounted on said end contour, and at least one locking device (5) supported on the flange ring.

6. A pipework assembly according to claim 5, wherein contour is a socket, and further comprising a sealing gasket (3) positioned in the socket, and a male end (2) of a second pipework component (B) inserted in the socket and radially compressing the sealing gasket, said male end having support means (6) cooperable with the locking device (5).

7. A pipework assembly according to claim 6, wherein the support means (6) comprise a retaining ring (33) fitted on the male end, and a welded abutment seam (32) formed on the male end.

8. A pipework assembly according to claim 7, wherein the sealing gasket is a locking-insert type gasket.

* * * * *